United States Patent [19]

Woodbridge et al.

[11] Patent Number: 5,799,160
[45] Date of Patent: *Aug. 25, 1998

[54] CIRCUIT AND METHOD FOR CONTROLLING BUS ARBITRATION

[75] Inventors: Nancy G. Woodbridge; Thomas A. Volpe, both of Austin; James G. Gay, Pflugerville, all of Tex.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 669,071

[22] Filed: Jun. 24, 1996

[51] Int. Cl.[6] .................................................. G06F 13/00
[52] U.S. Cl. ............................................................. 395/293
[58] Field of Search .................................. 395/293, 287, 395/290

[56] References Cited

U.S. PATENT DOCUMENTS

| | | | |
|---|---|---|---|
| 5,404,535 | 4/1995 | Barlow et al. | 395/726 |
| 5,471,625 | 11/1995 | Mussemann et al. | 395/750 |
| 5,475,850 | 12/1995 | Kahn | 395/290 |
| 5,613,075 | 3/1997 | Wade et al. | 395/287 |
| 5,630,147 | 5/1997 | Datta et al. | 395/750 |

OTHER PUBLICATIONS

IBM Microelectronics Division, PowerPC 403GA, PPC403GA User's Manual, pp. 11–13 and pp. 3-28-3-33.
Motorola 1994 M68060/MC68LC060 and MC68EC060 Microprocessors User's Manual, Rev. 1, Section 7, pp. 7-52-7-71.
Motorola 1995 DSP56300 24-Bit Digital Signal Processor Family Manual, Section 2, pp. 2-16-2-26.

Primary Examiner—Ayaz R. Sheikh
Assistant Examiner—David A. Wiley

[57] ABSTRACT

Control over bus arbitration within a data processing system between a plurality of bus devices (101, 102) coupled by a bus (103) is performed in a user programmable manner by implementing logic circuitry that is responsive to a user programmable bit within a register (203) so that when the bit is asserted, the bus device (102) is able to maintain control over access to the external bus (103). Such a technique is useful for permitting a processor (201) to maintain mastership of an external bus (103) with respect to a direct memory access device (101) also coupled to the bus (103).

5 Claims, 2 Drawing Sheets

CIRCUIT AND METHOD FOR CONTROLLING BUS ARBITRATION

TECHNICAL FIELD

The present invention relates in general to data processing systems, and in particular, to a circuit and method for providing bus arbitration under control of software.

BACKGROUND INFORMATION

Bus arbitration is the process of monitoring and managing competing demands for bus resources made by multiple devices coupled to a bus ("bus devices"). Bus devices may be any type of device coupled to a bus and requiring use of the bus at selected times. A bus device may be a direct memory access ("DMA") device, a video controller, a processor, or some other type of input/output ("I/O") device.

Many data processing systems involve a bus design that provides for one bus master at a time. A bus master is a bus device that controls the bus for any particular period of time.

More than one device having the capability to control the bus can be attached to the bus. In some system designs an external arbiter is used to prioritize requests and determine which device is granted access to the bus. When a bus device has been granted access to the bus as bus master (also referred to herein as obtaining "mastership of the bus"), it uses the bus to transfer instructions or data on the bus.

Furthermore, such systems are sometimes designed where an external arbiter controls bus arbitration and the processor coupled to the bus acts as a slave device requesting ownership of the bus from the arbiter. Because the system designer defines the functionality of the external arbiter, it can be configured to support any desired priority scheme. For systems in which the processor is the only possible bus master, the bus can be continuously granted to the processor, and no arbiter is needed. Systems that include several devices that can become bus masters require an arbiter to assign priorities to these devices so, when two or more devices simultaneously attempt to become the bus master, the one assigned the highest priority becomes the bus master first. The arbiter may be designed to require two or more wires dedicated to requesting and granting ownership of the bus.

In many arbitration schemes, bus devices are assigned priorities making any one particular device the lowest priority master in the system. Although this may be desirable in many cases, in some cases it is desirable for the lowest priority master device to temporarily obtain the bus outside of the standard priority scheme. As noted above, this problem may be solved by adding another wire to the arbitration and/or adding an external arbiter. However, this requires additional hardware to be implemented within the system.

Thus, there is a need in the art for a system and method for allowing a bus device to retain control of the bus even when that bus device is not predetermined to be the highest priority master of the bus in the system.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 1:
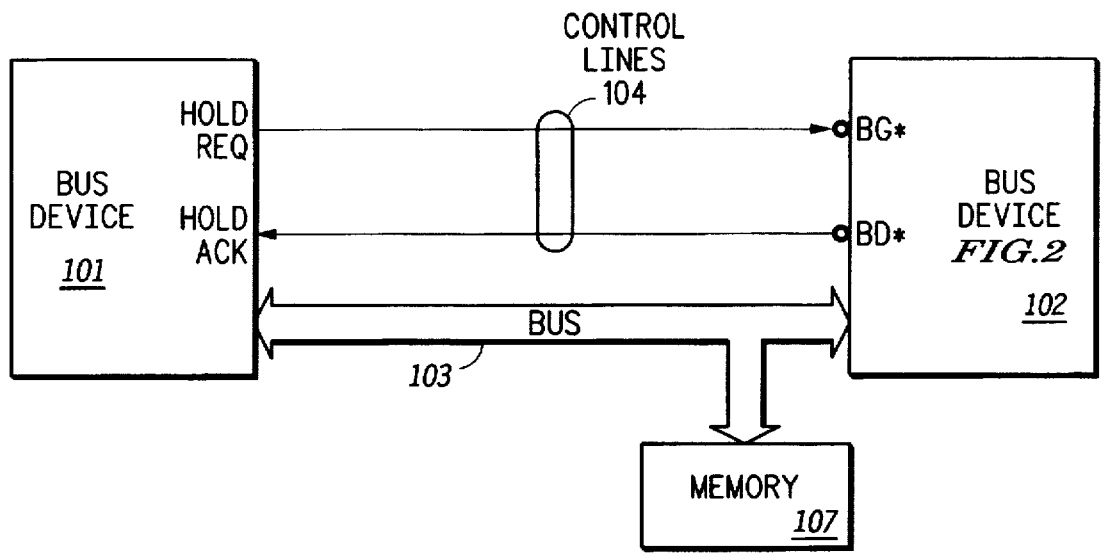
FIG. 1 illustrates a two-wire arbitration scheme for assigning control of a bus between a plurality of bus devices.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated a portion of a data processing system embodying bus devices 101 and 102 coupled by external bus 103. As noted previously, a bus device may be a direct memory access device, a video controller, a processor, or some other type of input/output device. Bus 103 may provide access to some type of memory resource 107 to bus devices 101 and 102. In this example, bus device 101 is designated as having a higher priority access to bus 103 than bus device 102. A two-wire arbitration scheme is implemented with control lines 104.

During normal operation, when bus device 101 desires to have control of bus 103, bus device 101 will send a hold request (HOLDREQ) signal to bus device 102, which is received as a bus grant (BG*, where the * indicates a complement of a signal) signal by bus device 102. When bus device 102 has completed its use of bus 103, it will return a bus driver (BD*) signal to bus device 101, which is received as a hold acknowledge (HOLDACK) signal by bus device 101. Upon receipt of the HOLDACK signal by bus device 101, bus device 101 is then able to take and maintain control of bus 103 for as long as desired by bus device 101. Only when bus device 101 changes the state of the HOLDREQ signal is bus device 102 capable of regaining control of bus 103.

The present invention, which may be embodied within bus device 102, allows bus device 102 to retain control, by a programmable (software) means, of bus 103.

Figure 2:
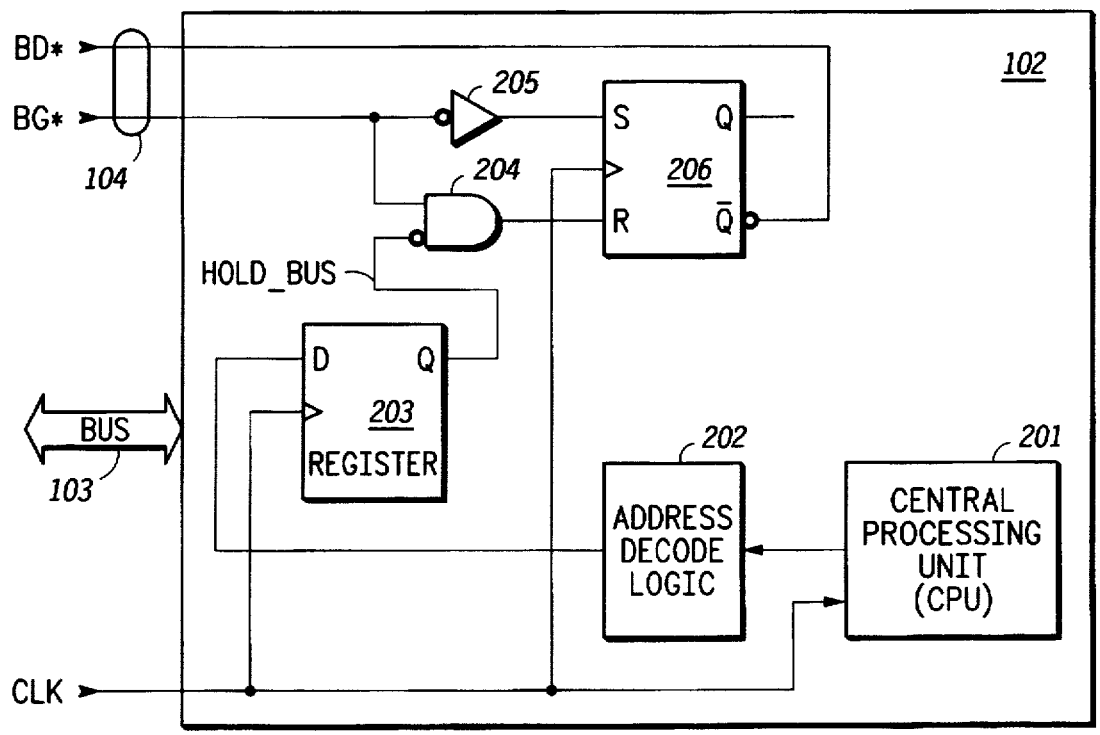
FIG. 2 illustrates an integrated circuit configured in accordance with the present invention.

Referring next to FIG. 2, there is illustrated a more detailed diagram of bus device 102, including circuitry for implementing the present invention. Note, other logic circuitry designs may be utilized to implement the basic concept of the present invention in addition to the implementation shown in FIG. 2.

The present invention uses a user programmable bit stored within register 203 that allows software control of the assertion of the BD* signal. When the bit in register 203 is negated, arbitration of bus 103 occurs, dependent upon the assertion of signal HOLDREQ by bus device 101. When the bit in register 203 is asserted, once mastership of bus 103 is attained by bus device 102, bus device 102 will continue to retain mastership of bus 103 until the bit in register 203 is negated by CPU 201, ignoring all assertions and negations of signal BG*.

Assertion and negation of the bit in register 203 may be performed under control of the user program from central processing unit ("CPU") 201 within bus device 102, which may be embodied within a single integrated circuit. Thus, a user of bus device 102 may program, with the use of an input/output means not illustrated in FIG. 2, the assertion or the negation of the bit within register 203 by addressing register 203 using typical address decode logic 202. It is well-known in the art for a CPU to be able to write to internal registers as a function of programming provided externally by a user or from some other system or process. Register 203 can be any programmable register accessed by software from CPU 201.

For the following discussion, BG* and BD* are typically active low signals.

As briefly described above, when the bit within register 203 has been negated by CPU 201, a corresponding Hold_Bus signal is also negated, or driven "low". This Hold-Bus signal is sent to the negated input of logical device 204, which is a two input AND gate with one negated input. Signal BG* is also connected to one of the inputs of logical device 204, and to the input of logical device 205, which is an inverter gate.

When the bit within register 203 is negated, causing signal Hold_Bus to also be negated, the output of logical device 204 is directly dependent upon its other input, which is signal BG*. If signal BG* is negated, or "high", the output of logical device 204 will be asserted, or driven "high". This causes the input R of logical device 206 (a synchronous SR flip-flop) to also be asserted, or "high", which means the output of logical device 206 will be reset, driving signal BD* negated, or "high". When signal BG* is negated, or "high", the output of logical device 205 will be negated, or "low". This causes the input S of logical device 206 to be negated, or "low", which has no effect on the output of logical device 206. If signal BG* is asserted, or "low", the output of logical device 205 will be asserted, or "high". This causes the input S of logical device 206 to be asserted, or "high", which means the Q output of logical device 206 will be asserted, or "high", while the Q* output will be asserted, or "low", driving signal BD* asserted, or "low". Thus, if the bit within register 203 is negated, the Hold_Bus signal will also be negated, causing the assertion and negation of the BD* output to follow the assertion and negation of the BG* input. The assertion and negation of signal BD* is synchronously delayed in time by one clock period from the assertion and negation of the BG* input because of logical device 206.

When the bit within register 203 is asserted, or "high", the corresponding Hold_Bus signal is also asserted, causing the output of logical device 204 to be negated which has no effect on the output of logical device 206. That is, the assertion or negation of signal BG* cannot cause signal BD* to be negated. If signal BG* is asserted, or "low", the output of logical device 205 will be asserted, or "high", resulting in the S input of logical device 206 being asserted, resulting in the Q output of logical device 206 being asserted, or "high", and the Q* output of logical device 206 being asserted, or "low", driving signal BD* asserted, or "low." Since the reset input of logical device 206 is held negated, or "low", by the output of logical device 204, signal BD* cannot be negated as long as the bit within register 203 is asserted. If signal BG* is negated, or "high", the output of logical device 205 will be negated, or "low", resulting in the S input of logical device 206 being negated, resulting in no change of the Q and Q* outputs of logical device 206. Since signal BG* is high, the output of logical device 204 will be low, causing the R input of logical device 206 to also be negated, or "low", resulting in no change on the Q and Q* outputs of logical device 206. Thus, assertion of the bit within register 203 causes the output of logical device 206 to remain asserted, preventing the assertion or negation of signal BG* from affecting the output of logical device 206. Since the output of logical device 206 is connected to the BD* output of bus device 102, bus device 102 retains bus ownership.

This shows that if signal Hold_Bus is asserted, signal BD* will be asserted when signal BG* is asserted and will remain asserted regardless of any future assertions or negations of signal BG*. If, however, signal Hold_Bus is negated, signal BD* will be asserted and negated as signal BG* is asserted and negated.

Figure 3:
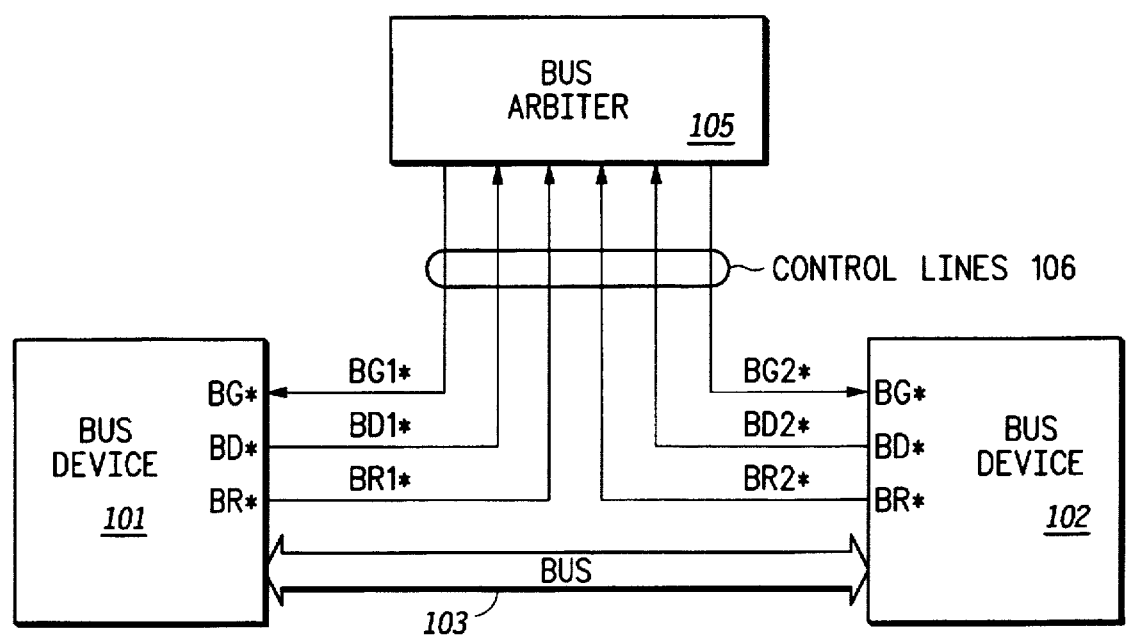
FIG. 3 illustrates an alternative embodiment of the present invention.

Referring to FIG. 3, there is illustrated a portion of a data processing system embodying bus devices 102 and 101 coupled by external bus 103 with control of external bus 103 provided by typical bus arbiter 105. In this example, bus arbiter 105 provides the arbitration scheme used to determine if bus device 101 or bus device 102 should control external bus 103. A three-wire arbitration scheme is implemented with control lines 106. The bus arbiter 105 may implement one of several different schemes, including, but not limited to round-robin, priority, and time-sharing, for selecting between bus devices 102 and 101 for access to external bus 103.

During normal operation, when bus device 101 requires control of external bus 103, bus device 101 will send a bus request (BR*) signal to bus arbiter 105 which is received as signal BR1* by the bus arbiter 105. When bus arbiter 105 has determined bus device 101 may use external bus 103, bus arbiter 105 asserts signal BG1*, which is received as signal BG* by bus device 101. When bus device 101 begins using external bus 103, bus device 101 will assert signal BD*, which is received by bus arbiter 105 as signal BD1*. When bus device 101 has completed using external bus 103, bus device 101 will negate signal BD*, signifying it no longer requires use of external bus 103.

Similarly, when bus device 102 requires control of external bus 103, bus device 102 will send a bus request (BR*) signal to bus arbiter 105 which is received as signal BR2* by bus arbiter 105. When bus arbiter 105 has determined bus device 102 may use external bus 103, bus arbiter 105 asserts signal BG2* which is received as signal BG* by bus device 102. When bus device 102 begins using external bus 103, bus device 102 will assert signal BD* which is received by bus arbiter 105 as signal BD2*. When bus device 102 has completed using external bus 103, bus device 102 will negate signal BD*, signifying it no longer requires use of external bus 103.

Bus device 102 and/or bus device 101 described with respect to FIG. 3 may utilize the circuitry of the present invention as described above with respect to FIG. 2 to retain control of bus 103. The present invention may be extended to more than two bus devices (101 and 102), with the addition of appropriate connections between the bus arbiter 105 and the additional bus devices.

One advantage of the present invention is that it allows bus device 102 to retain control of bus 103 even if signal BG* has been negated so bus device 102 may control external hardware coupled to bus 103. This is useful when the external hardware requires real-time control sequences.

Another advantage of the present invention is that it allows a user to implement a two-wire "glueless" (no external logic circuitry needed) bus arbitration scheme with an external bus device while still retaining control over the execution of "critical" code that requires access to the external bus.

Yet still another advantage of the present invention is that it provides user programmability of control of the bus arbitration within a data processing system to one particular bus device.

Although the present invention and its advantages have been described in detail, it should be understood that various changes, substitutions and alterations can be made herein without departing from the spirit and scope of the invention as defined by the appended claims.

We claim:

1. A bus master which is adapted to be coupled to an external bus, comprising:

an input terminal coupled to the external bus for receiving a request signal which when activated indicates that an alternate bus master is requesting access to the external bus;

an output terminal coupled to the external bus for providing an acknowledge signal which when active indicates that the bus master is allowing said alternate bus master to receive control of the external bus;

a register for storing control information;

a central processing unit (CPU) having an output coupled to said register, wherein said CPU may alter a state of said control information in response to executing at least one introduction; and a control circuit having a first input terminal for receiving said request signal, a second input terminal for receiving said control information, and an output terminal for providing said acknowledge signal, wherein when said control information is in a first predetermined state, said control circuit activates said acknowledge signal in response to an activation of said request signal;

wherein when said control information is in a second predetermined state, said control circuit keeps said acknowledge signal inactive regardless of whether said request signal is active or inactive.

2. The bus master of claim 1 wherein said control information includes a control bit wherein said control bit is in a first logic state when said control information is in said first predetermined state and said control bit is in a second logic state when said control information is in said second predetermined state.

3. The bus master of claim 2 wherein said control circuit comprises:

an AND gate having a complementary input terminal for receiving said control bit, a true input terminal for receiving said request signal, and an output terminal;

an inverter having an input terminal for receiving said request signal, and an output terminal; and a set/reset flip-flop having a set input terminal coupled to said output terminal of said inverter, a reset terminal coupled to said output terminal of said AND gate, and a complementary output terminal for providing said acknowledge signal.

4. In a data processing system comprising an external bus adapted to be coupled to first and second bus master devices, a method for said first bus master to arbitrate for use of said external bus comprising the steps of:

receiving and storing a control bit in a storage device located within the first bus master device in response to at least one software instruction;

receiving an external request signal which indicates that the second bus master device is requesting usage of the external bus;

if said control bit is in a first logic state, activating an external acknowledge signal in response to an activation of said external request signal to indicate that the second bus master device may use the external bus; and if said control bit is in a second logic state, keeping said external acknowledge signal inactive regardless of a state of said external request signal to indicate that the second bus master device may not use the external bus.

5. The method of claim 4 further comprising the step of activating said external acknowledge signal if said control bit changes from said second logic state to said first logic state when said external request signal is active.

* * * * *